United States Patent
Ferrara et al.

(10) Patent No.: US 11,482,903 B2
(45) Date of Patent: Oct. 25, 2022

(54) ROTARY ELECTRIC MACHINE WITH IMPROVED SLOT INSULATION

(71) Applicant: FERRARI S.p.A., Modena (IT)

(72) Inventors: Davide Ferrara, Modena (IT); Luca Poggio, Modena (IT); Paolo Faverzani, Modena (IT)

(73) Assignee: FERRARI S.P.A., Modena (IT)

( * ) Notice: Subject to any disclaimer, the term of this patent is extended or adjusted under 35 U.S.C. 154(b) by 52 days.

(21) Appl. No.: 17/167,779

(22) Filed: Feb. 4, 2021

(65) Prior Publication Data

US 2021/0242741 A1   Aug. 5, 2021

(30) Foreign Application Priority Data

Feb. 5, 2020  (IT) .................... 102020000002263

(51) Int. Cl.
| | |
|---|---|
| *H02K 3/34* | (2006.01) |
| *H02K 1/278* | (2022.01) |
| *H02K 3/02* | (2006.01) |
| *H02K 21/14* | (2006.01) |

(52) U.S. Cl.
CPC ............ *H02K 3/345* (2013.01); *H02K 1/278* (2013.01); *H02K 3/02* (2013.01); *H02K 21/14* (2013.01)

(58) Field of Classification Search
CPC ............ H02K 1/27; H02K 1/278; H02K 3/02; H02K 3/34; H02K 3/345; H02K 21/14
USPC .... 310/156.55, 179, 205, 208, 215, 216.105
See application file for complete search history.

(56) References Cited

U.S. PATENT DOCUMENTS

| | | | |
|---|---|---|---|
| 2011/0050026 A1* | 3/2011 | Kaiser ................... | B60L 50/16 903/906 |
| 2015/0249372 A1 | 3/2015 | Sakaue et al. | |
| 2016/0365164 A1 | 12/2016 | Fukuda et al. | |
| 2017/0294249 A1 | 10/2017 | Oya et al. | |
| 2021/0013760 A1* | 1/2021 | Enomoto ............... | H02K 3/325 |
| 2021/0044160 A1* | 2/2021 | Leiber ................... | H02K 3/345 |
| 2022/0131431 A1* | 4/2022 | Coppola ................ | H02K 21/14 |
| 2022/0140714 A1* | 5/2022 | Mawatari ............... | H02K 3/28 310/264 |

OTHER PUBLICATIONS

Search Report issued in Italiaon Patent Application No. 202000002263 completed Oct. 19, 2020; 7 pages.
Extended European Search Report dated Jul. 5, 2021 for Application No. 21155362.3, 8 pages.

\* cited by examiner

*Primary Examiner* — Rashad H Johnson
(74) *Attorney, Agent, or Firm* — Cantor Colburn LLP

(57) ABSTRACT

Electric machine having: a shaft; a rotor with permanent magnets that is fitted to the shaft; a stator having a magnetic core which consists of a series of laminations made of ferromagnetic material and longitudinally crossed by a plurality of stator slots; and a stator winding having a plurality of rigid bars that are inserted in corresponding stator slots and that are covered, on the outside, with an insulating coating. Each stator slot is completely free from an insulating element interposed between the ferromagnetic material making up the laminations of the magnetic core and the corresponding bars, so that an outer surface of the corresponding bars is in direct contact with an inner surface of the stator slot made of the ferromagnetic material.

5 Claims, 10 Drawing Sheets

ROTARY ELECTRIC MACHINE WITH IMPROVED SLOT INSULATION

CROSS-REFERENCE TO RELATED APPLICATIONS

This patent application claims priority from Italian patent application no. 102020000002263 filed on Feb. 5, 2020, the entire disclosure of which is incorporated herein by reference.

SECTOR OF THE ART

The present invention relates to a rotary electric machine.

The present invention is advantageously applied to an automotive rotary electric machine that is installed on-board a vehicle and that can be used as a motor (absorbing electric power and generating a mechanical torque) or as a generator (converting mechanical power into electric power).

PRIOR ART

An automotive rotary electric machine comprises a shaft, which is mounted so as to rotate around a central rotation axis, a rotor generally with permanent magnets that is fitted to the shaft to rotate together with the shaft, and a stator with a tubular, cylindrical shape arranged around the rotor to enclose the rotor therein.

It has long been proposed to carry out the stator winding by means of rigid bars: rigid bars are firstly shaped as a "U" and are thus axially inserted into the stator slots forming an inlet side, wherein the cusps of the "U"-shaped bars are arranged, and an outlet side, wherein the legs (i.e. the straight portions) of the "U"-shaped bars are arranged; once inserted the bars into the stator slots the legs in the outlet side are bent and the free ends of the legs are connected between them by means of welding to form the electrical paths of the stator winding.

Patent Application US2015249372A1 discloses a rotary electric machine wherein each stator slot is completely free from an insulating element interposed between the ferromagnetic material making up the laminations of the ferromagnetic core and the corresponding bars of the stator winding.

Patent Application US2016365164A1 discloses an electric conductor with a rectangular section that is insulated on the outside by a plurality of resin layers superimposed one over the other.

DESCRIPTION OF THE INVENTION

The object of the present invention is to provide a rotary electric machine having a greater power efficiency and a greater specific performance (power and/or torque).

According to the present invention a rotary electric machine is provided, according to what claimed in the enclosed claims.

The claims describe preferred embodiments of the present invention forming an integral part of the present disclosure.

BRIEF DESCRIPTION OF THE DRAWINGS

The present invention will now be described with reference to the attached drawings, which illustrate a non-limiting embodiment thereof.

PREFERRED EMBODIMENTS OF THE INVENTION

Figure 1:
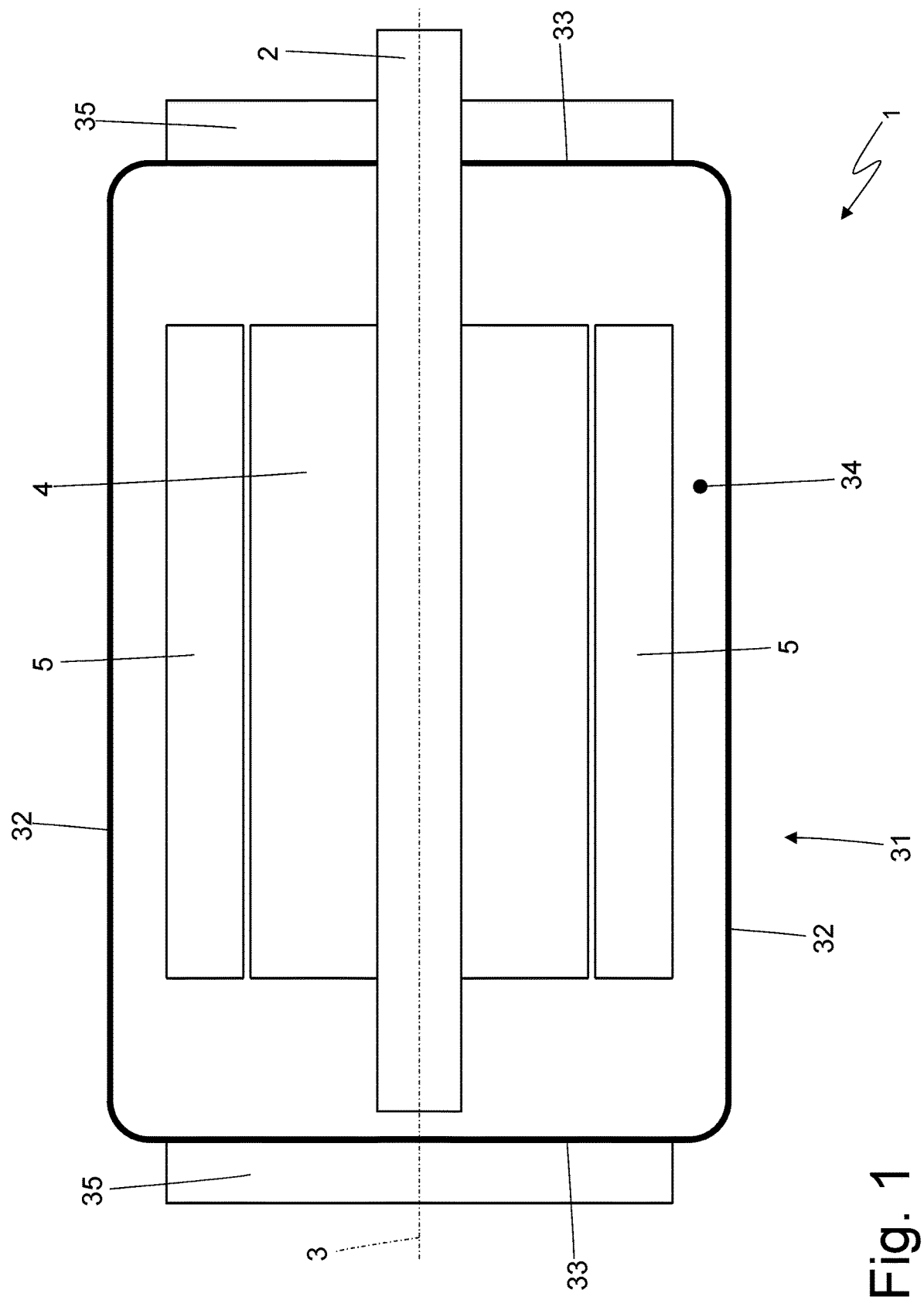
FIG. 1 is a schematic and longitudinal section view of a rotary electric machine made according to the present invention.

In FIG. 1, an automotive synchronous electric machine of the reversible type (i.e. which can operate both as an electric motor absorbing electric power and generating a drive torque, and as an electric generator absorbing mechanical power and generating electric power) is overall indicated by 1.

The electric machine 1 comprises a shaft 2, which is mounted so as to rotate around a central rotation axis 3, a rotor 4 with permanent magnets that is fitted to the shaft 2 to rotate with the shaft 2, and a stator 5 with a cylindrical tubular shape arranged around the rotor 4 so as to enclose the rotor 4 therein.

Between the rotor 4 and the stator 5 an annular-shaped air gap having a small thickness (normally that required to allow rotating the rotor 4 inside the stator 5 in full safety) is defined.

Figure 2:
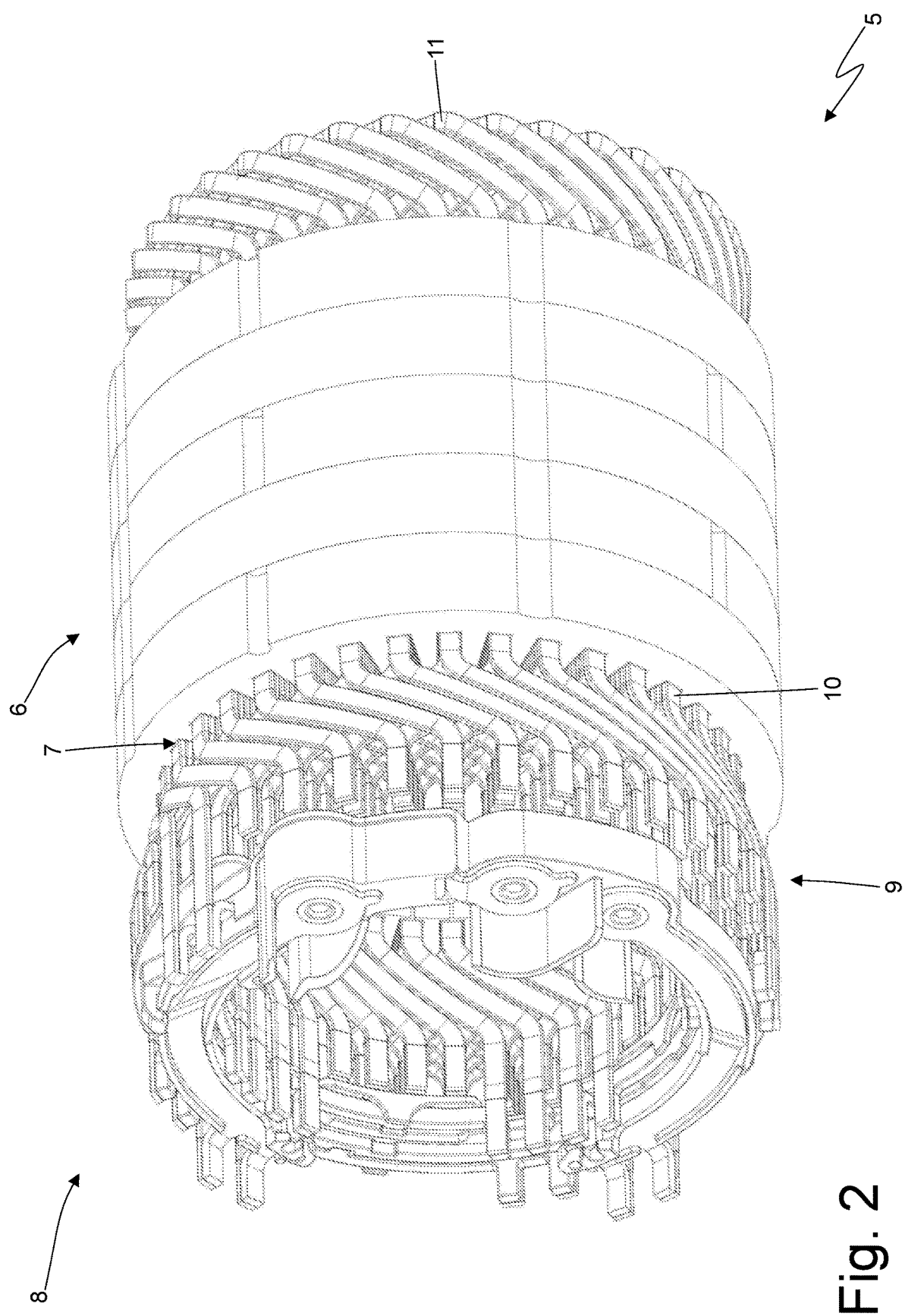
FIG. 2 is a perspective view of a stator of the rotary electric machine of FIG. 1.
Figure 3:
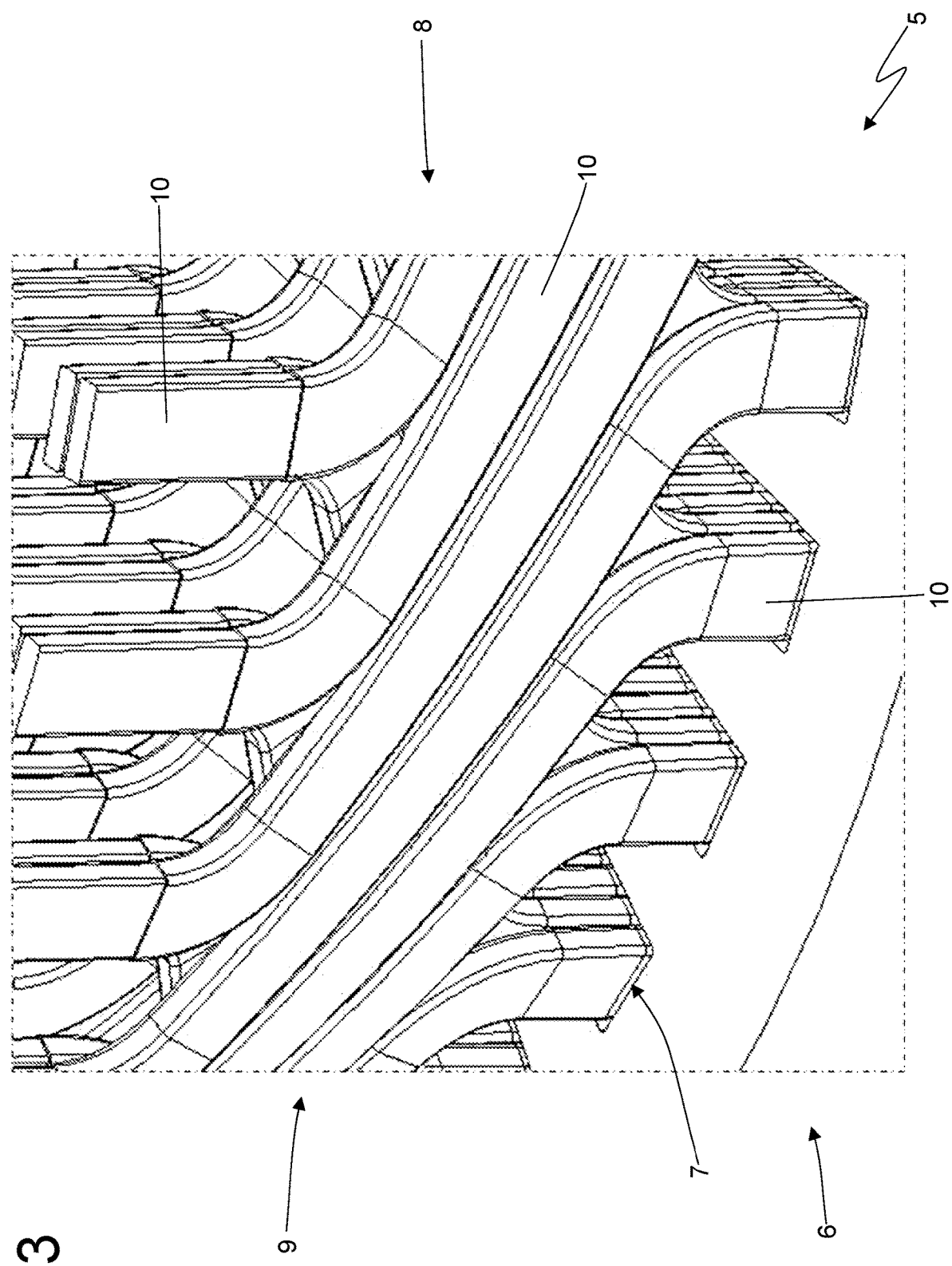
FIG. 3 is an enlarged scale view of a detail of FIG. 2.

According to what shown in FIGS. 2 and 3, the stator 5 comprises a magnetic core 6 which is formed of a series of laminations (made of ferromagnetic material) tightly packed (i.e. packed between each other) and has a centrally holed tubular shape; the magnetic core 6 is longitudinally (axially) crossed by a plurality of stator slots 7 which are evenly distributed along the inner side of the magnetic core 6 and which house a three-phase stator winding 8.

The three-phase stator winding 8 comprises a series of "U"-shaped copper rigid bars 9, each of which comprises two legs 10 connected between each other by a cusp 11; the two legs 10 of a same bar 9 constitute two corresponding conductors of the stator winding 8. The "U"-shaped bars 9 are inserted into the stator slots 7 defining an inlet side, wherein the cusps 11 of the "U"-shaped bars 9 are arranged, and an outlet side, wherein the legs 10 of the "U"-shaped bars 9 are arranged. In particular and according to what better shown in FIG. 4, in each stator slot 7 eight legs 10 are arranged (i.e. eight conductors of the stator winding 8) belonging to eight corresponding "U"-shaped rigid bars 9. According to what shown in FIG. 2, the ends of the legs 10 of the "U"-shaped bars 9 are bent and hence electrically connected (welded) between each other to form the electrical paths of the stator winding 8. As a result, if we consider one single stator slot 7, each bar 9 has a straight central portion being inserted into the corresponding stator slot 7 and two end portions that are bent relative to the central portion.

Figure 5:
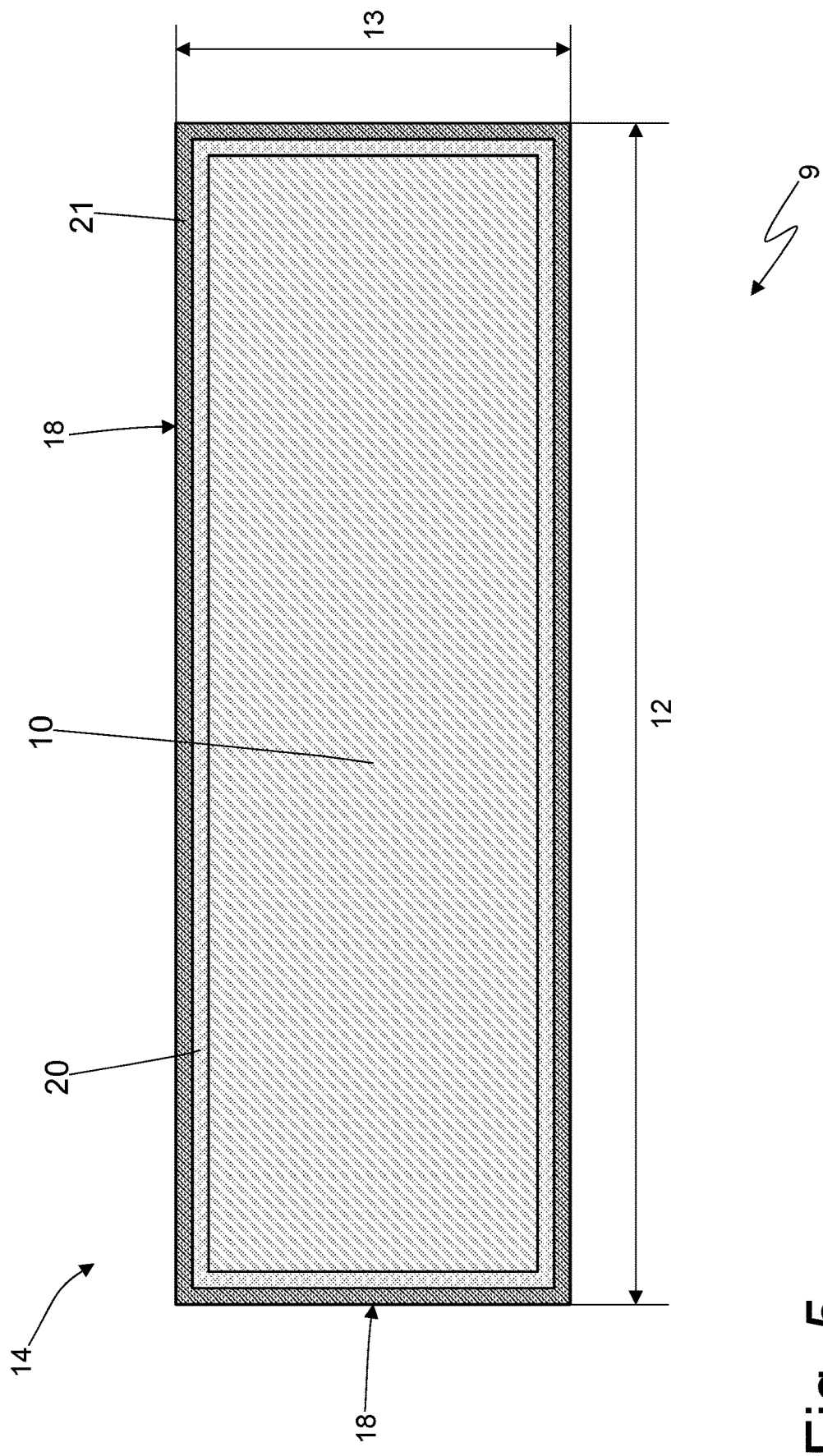
FIG. 5 is a transversal section view of a bar of a stator winding of the stator of FIG. 2.

According to what shown in FIG. 5, each bar 9 has a rectangular transversal section having a longer side 12 and a shorter side 13 and is covered on the outside with an insulating coating 14.

Figure 4:
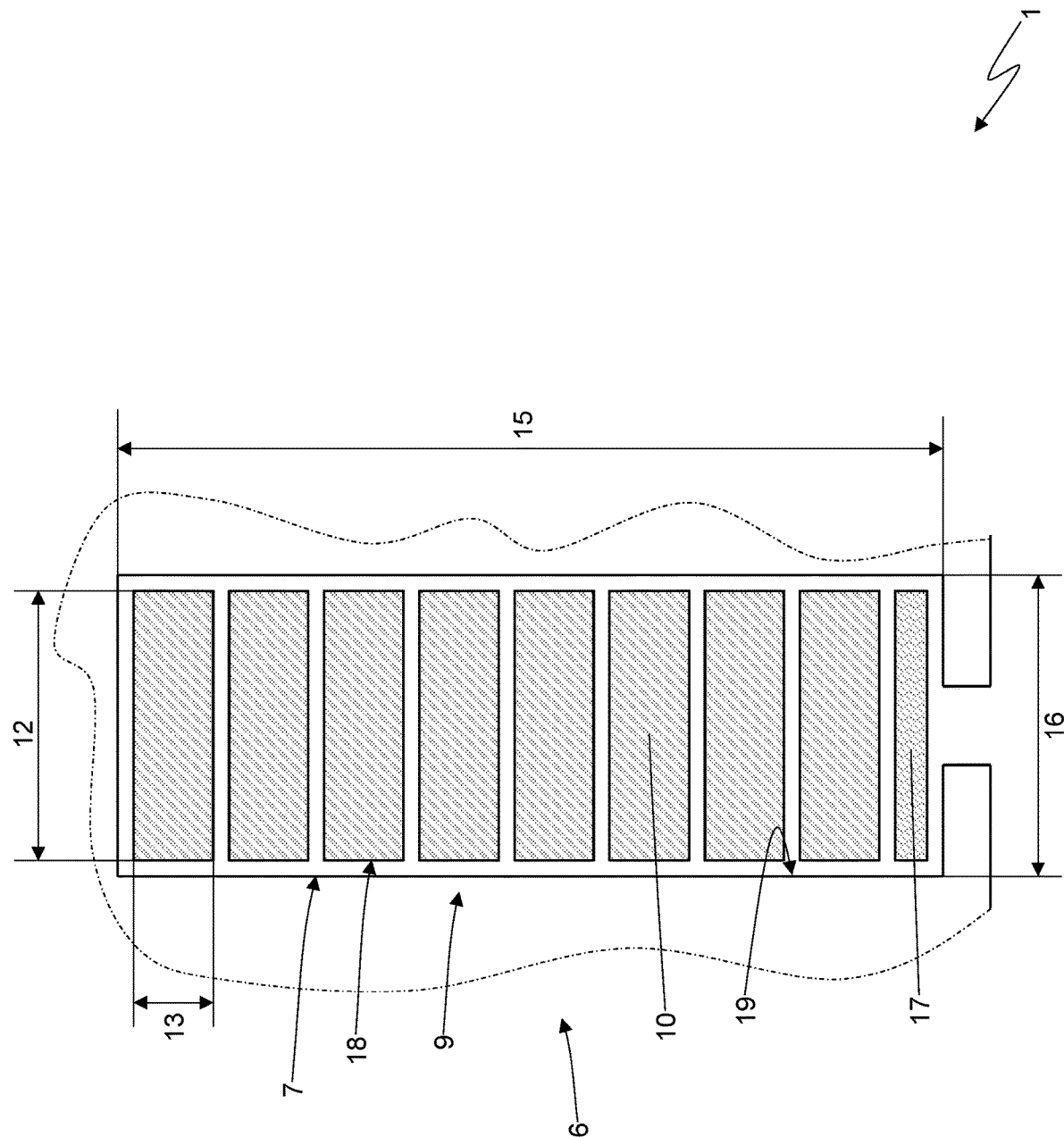
FIG. 4 is a transversal section view of a stator slot of the stator of FIG. 2.

According to what shown in FIG. 4, each stator slot 7 has a rectangular transversal section having a longer side 15 that is arranged radially and a shorter side 16 arranged circumferentially.

As previously said and as illustrated in FIG. 4, each stator slot 7 houses eight bars 9 arranged one after the other in a row; furthermore, each bar 9 has a rectangular transversal section having the longer side 12 parallel to the shorter side 16 of the corresponding stator slot 7 and the shorter side 13 parallel to the longer side 15 of the corresponding stator slot 7. Furthermore, and as better shown in FIG. 5, in each bar 9 the ratio between the longer side 12 and the shorter side 13 of the rectangular transversal section is higher than 2 and preferably higher than 3; in particular according to a preferred embodiment, in each bar 9 the ratio between the longer side 12 and the shorter side 13 of the rectangular transversal section is between 3 and 3.7. This arrangement and this conformation of the bars 9 combined between them allow to significantly reduce power losses due to skin effect inside the bars 9 increasing the power efficiency and also increasing the specific performance (power and/or torque).

According to a preferred embodiment shown in FIGS. 2 and 3, each bar 9 is bent around the shorter side 13 of the rectangular transversal section, i.e. each bar 9 is bent "along the side". In other words, each bar 9 is bent relative to the shorter side 13 (along the shorter side 13) of the rectangular transversal section.

According to the embodiment shown in FIG. 4, in each stator slot 7 the legs 10 of eight bars 9 are arranged in a row and a filling element 17 (optional) is arranged which has a given elastic deformability and has the function of filling the remaining space inside the stator slot 7 compacting the legs 10 of the eight bars 9.

According to what shown in FIG. 4, each stator slot 7 is completely free from an insulating element interposed between the ferromagnetic material making up the laminations of the magnetic core 6 and the corresponding bars 9, so that an outer surface 18 of the corresponding bars 9 is in direct contact with an inner surface 19 of the stator slot 7 made of ferromagnetic material of the stator slot 7. This solution forces to increase the thickness of the insulating coating 14 of each bar 9, however it allows to overall increase the filling coefficient of the stator slots 7 (i.e. the ratio between the area of the overall transversal section of the copper present in each stator slot 7 and the area of the transversal section of the stator slot 7) increasing the specific performance (power and/or torque).

According to what shown in FIG. 5, the insulating coating 14 which covers on the outside each bar 9 has a thickness higher than 0.30 mm (e.g. equal to 0.35-0.40 mm). Furthermore, according to one possible though non-limiting embodiment, the insulating coating 14 covering on the outside each bar 9 has an inner layer 20 which is in direct contact with the copper and has a thickness of about 0.20-0.25 mm and an outer layer 21 which is arranged above the inner layer 20, has a thickness of about 0.10-0.15 mm, and is in direct contact with the ferromagnetic material making up the laminations of the magnetic core 6. The inner layer 20 consists of a first material (an enamel or a resin) and the outer layer 21 consists of a second material (an enamel or a resin) which differs from the first material. In particular, the second material is mechanically stronger and electrically less insulating than the first material; i.e. the inner layer 20 essentially has the function of ensuring electric insulation while the outer layer 21 essentially has the function of mechanically protecting the inner layer 20 from rubbing against the inner surface 19 of the stator slot 7 when the leg 10 of the bar 9 is inserted in the stator slot 7.

Figure 7:
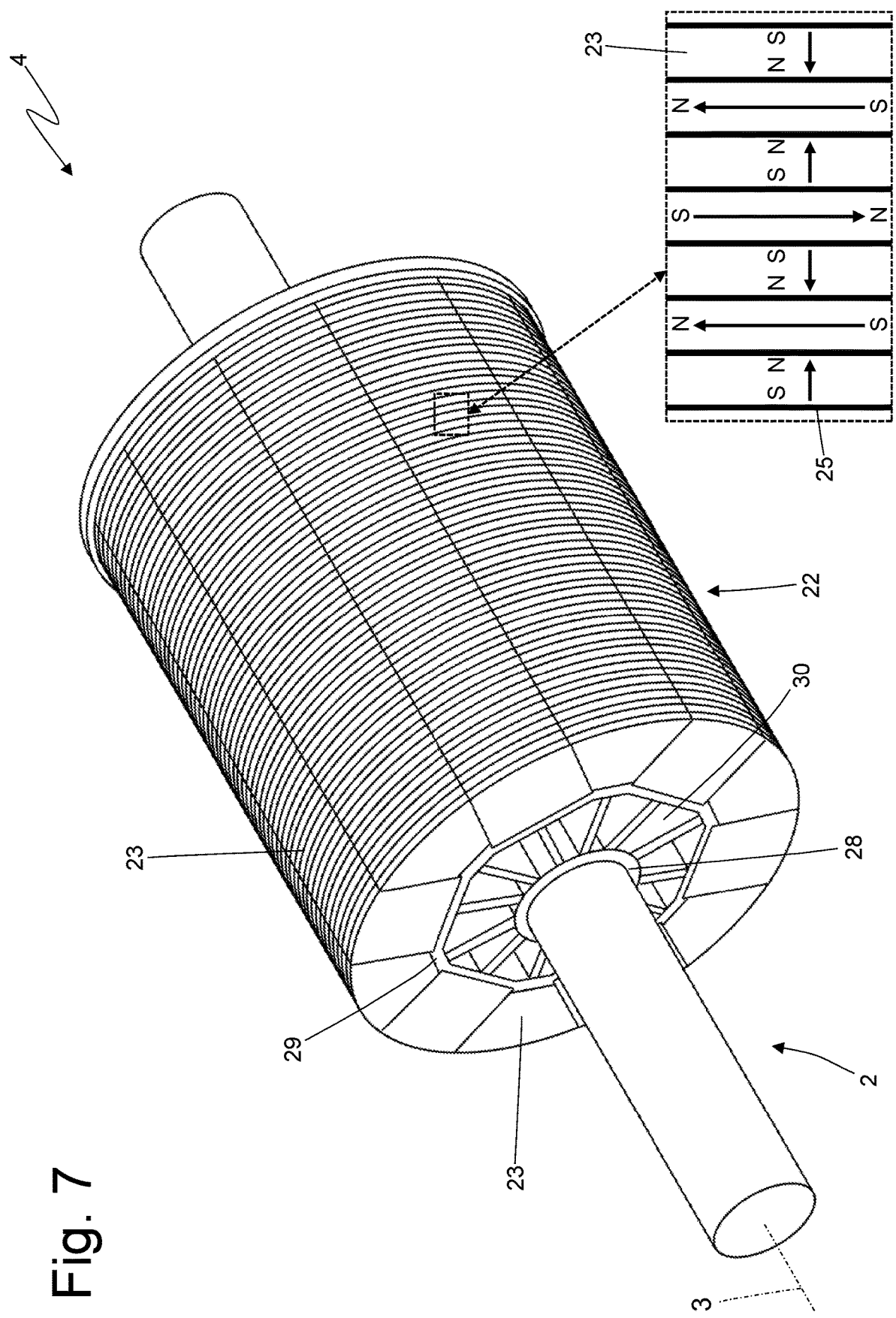
FIG. 7 is a perspective view of the rotor of FIG. 6 with some parts being removed for the sake of clarity.

According to what shown in FIG. 7, the rotor 4 comprises a plurality of columns 22 of permanent magnets, which are oriented axially and arranged beside one another around the rotation axis 3 to form a closed ring. In the embodiment shown in FIG. 7 they are provided twelve columns 22 of permanent magnets arranged so as to form a closed ring, but according to other embodiments not shown the overall number of columns 22 of permanent magnets may be different; for instance eight to twenty-four columns 22 of permanent magnets may be provided.

Each column 22 of permanent magnets consists of a sequence of permanent magnets 23 arranged in a row beside one another, i.e. each column 22 of permanent magnets is made up of a plurality of permanent magnets 23 which are arranged axially one after the other; in particular, in each column 22 of permanent magnets, twenty to sixty permanent magnets 23 arranged in a row beside one another are generally provided.

Each column 22 of permanent magnets is made up of a plurality of permanent magnets 23 which are axially arranged one after the other according to a Halbach array to radially nullify the magnetic field inside the permanent magnets 23 and to radially maximize the magnetic field outside the permanent magnets 23. In other words, the permanent magnets 23 in each column 22 of permanent magnets are arranged to radially nullify the magnetic field inside the permanent magnets 23 (towards the shaft 2) and to radially maximize the magnetic field outside the permanent magnets 23 (towards the magnetic core 6 of the stator 5).

A Halbach array is a particular union (arrangement) of the permanent magnets 23 arranged so as to strengthen the magnetic field along a face of the array (the radially most external face in the present embodiment) and to remove (nullify) at the same time by interference the magnetic field at the opposite face (the radially most internal face in the present embodiment). As shown in FIG. 7, the Halbach array provides that groups of four permanent magnets 23 are cyclically repeated: a permanent magnet 23 having a South-North orientation axially arranged rightward, a further permanent magnet 23 having a South-North orientation radially arranged outwardly (i.e. moving away from the central rotation axis 3), a further permanent magnet 23 having a South-North orientation axially arranged leftward and a further permanent magnet 23 having a South-North orientation radially arranged inwards (i.e. approaching the central rotation axis 3).

In the embodiment shown in the enclosed figures, the columns 22 of permanent magnets have a rectangular transversal section and a rectangular and isosceles trapezoidal rectangular section; according to a different embodiment not shown, the columns 22 of permanent magnets have all the same isosceles trapezoidal rectangular section.

Figure 8:
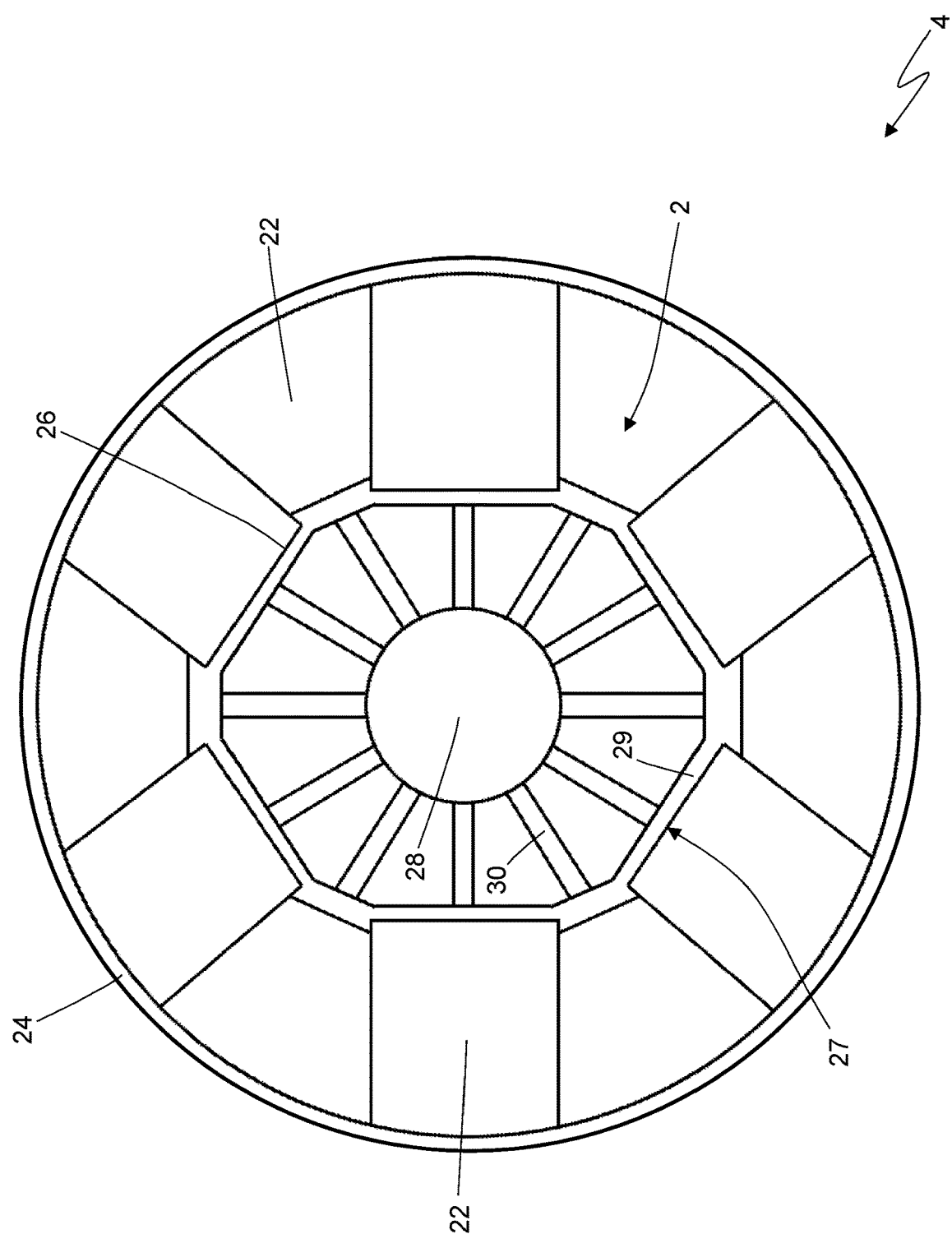
FIG. 8 is a transversal section view of the rotor of FIG. 6.

According to what better shown in FIG. 8, the rotor 4 is completely free from a ferromagnetic material arranged on the outside the permanent magnets 23 (externally with respect to the permanent magnets 23), i.e. the rotor 4 is both free from ferromagnetic material arranged radially on the outside of the permanent magnets 23 (i.e. between the permanent magnets 23 and the magnetic core 6 of the stator 5), and free from the a ferromagnetic material arranged radially on the inside of the permanent magnets 23 (i.e. between the permanent magnets 23 and the shaft 2).

Figure 6:
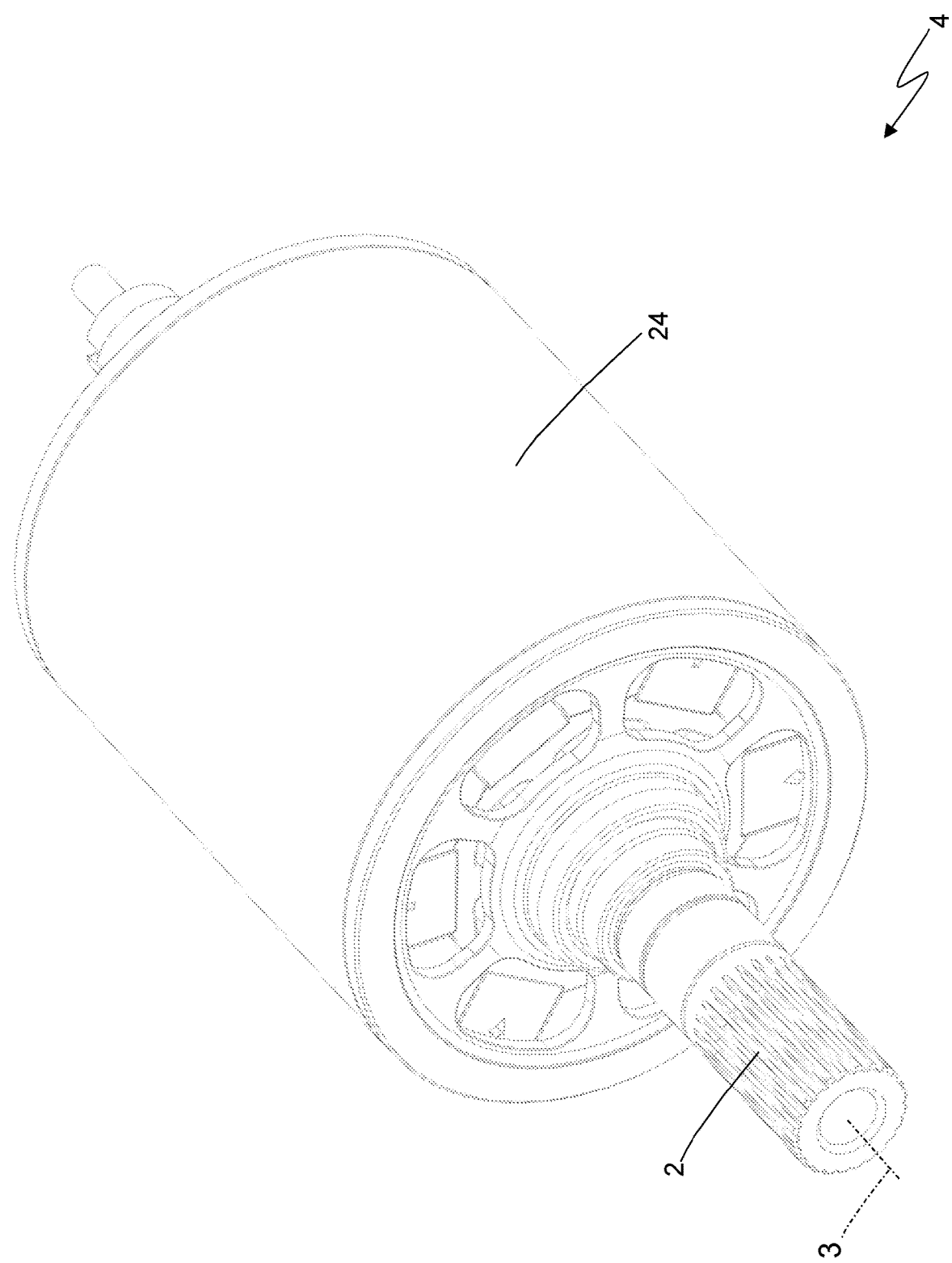
FIG. 6 is a perspective view of a rotor of the rotary electric machine of FIG. 1.

According to what shown in FIGS. 6 and 8, the rotor 4 comprises a containment element 24 (not shown in FIG. 7) which is arranged around the columns 22 of permanent magnets to keep the columns 22 of permanent magnets in contact with the shaft 2; i.e. the containment element 24 covers on the outside the columns 22 of permanent magnets so as to make a radial containment of the columns 22 of permanent magnets such to avoid the centrifugal force from pushing them against the magnetic core 6 of the stator 5. According to one possible embodiment, the containment element 24 consists of a resin-treated filament that is wound in a spiral around the columns 22 of permanent magnets; according to an alternative embodiment, the containment element 24 consists of a tubular element made of composite material, light non-ferromagnetic metal material (for instance aluminium), or of ferromagnetic metal material.

According to a preferred embodiment shown in FIG. 7, in each column 22 of permanent magnets the single permanent magnets 23 are glued between each other by interposing a glue 25 which is preferably an electric insulation so as to reduce the power losses due to Eddy currents. In other words, each column 22 of permanent magnets is made by gluing the single permanent magnets 23 between each other by the glue 25 which is preferably an electric insulation.

According to a preferred embodiment shown in FIGS. 7 and 8, the columns 22 of permanent magnets are mounted directly on an outer wall of the shaft 2; in particular, each column 22 of permanent magnets is glued to the outer wall of the shaft 2 by a glue 26 (shown in FIG. 8) which is preferably an electric insulation (to avoid "short-circuiting" the various permanent magnets 23 of a same column 22 of permanent magnets between them by the outer wall of the shaft 2). In other words, between the outer wall of the shaft 2 and the columns 22 of permanent magnets an electrically insulating layer consisting of glue 26 is interposed. According to a different embodiment, the glue 26 may also be an electric insulation; i.e. the glue 26 is not required to be an electric insulation.

The glue 26 has the function of electrically insulating the columns 22 of permanent magnets from the underlying outer wall of the shaft 2 and has also the function of connecting the columns 22 of permanent magnets to the outer wall of the shaft 2 while the rotor 4 is being constructed (the mechanical holding of the columns 22 of permanent magnets is carried out by the containment element 24 as the glue 26 is not able to bear the centrifugal force when the rotor 4 rotates at high speed).

According to a preferred embodiment shown in FIGS. 7 and 8, the outer wall of the shaft 2 has a plurality of seats 27, each of which is adapted to accommodate a corresponding column 22 of permanent magnets; i.e. each seat 27 is shaped such to reproduce in the form of a recess the shape of the corresponding column 22 of permanent magnets so as to accommodate and house with a minimum clearance the columns 22 of permanent magnets.

According to what shown in FIG. 8, the shaft 2 has a hub 28 supported by bearings (not shown), a rim 29 which is arranged around the hub 28 at a given distance from the hub 28 and supports the columns 22 of permanent magnets (i.e. it constitutes the outer wall of the shaft 2), and a plurality of spokes 30 which develop radially and connect the hub 28 to the rim 29 such that between the hub 28 and the rim 29 there is some empty space.

According to what shown in FIG. 1, the electric machine 1 comprises a casing 31 which houses the stator 5 therein and has a cylindrical central body 32 arranged around the magnetic core 6 of the stator 5 and two cup-shaped caps 33 (but they could also be flat) that close the central body 32 on the opposite sides. Between an outer surface 18 of the magnetic core 6 of the stator 5 and an inner surface 19 of the central body 32 of the casing 31 an annular hollow space 34 is obtained, which is adapted to allow an air flow to circulate. In the embodiment shown in FIG. 1, each cap 33 is coupled with a liquid—(i.e. inside which a cooling liquid circulates) or air-heat exchanger 35 (i.e. hit by a cool air flow); according to different embodiments, a single heat exchanger 35 is provided that is coupled with only a cap 33 (as shown in FIG. 10) or no heat exchanger 35 is provided (variant not shown).

Figure 9:
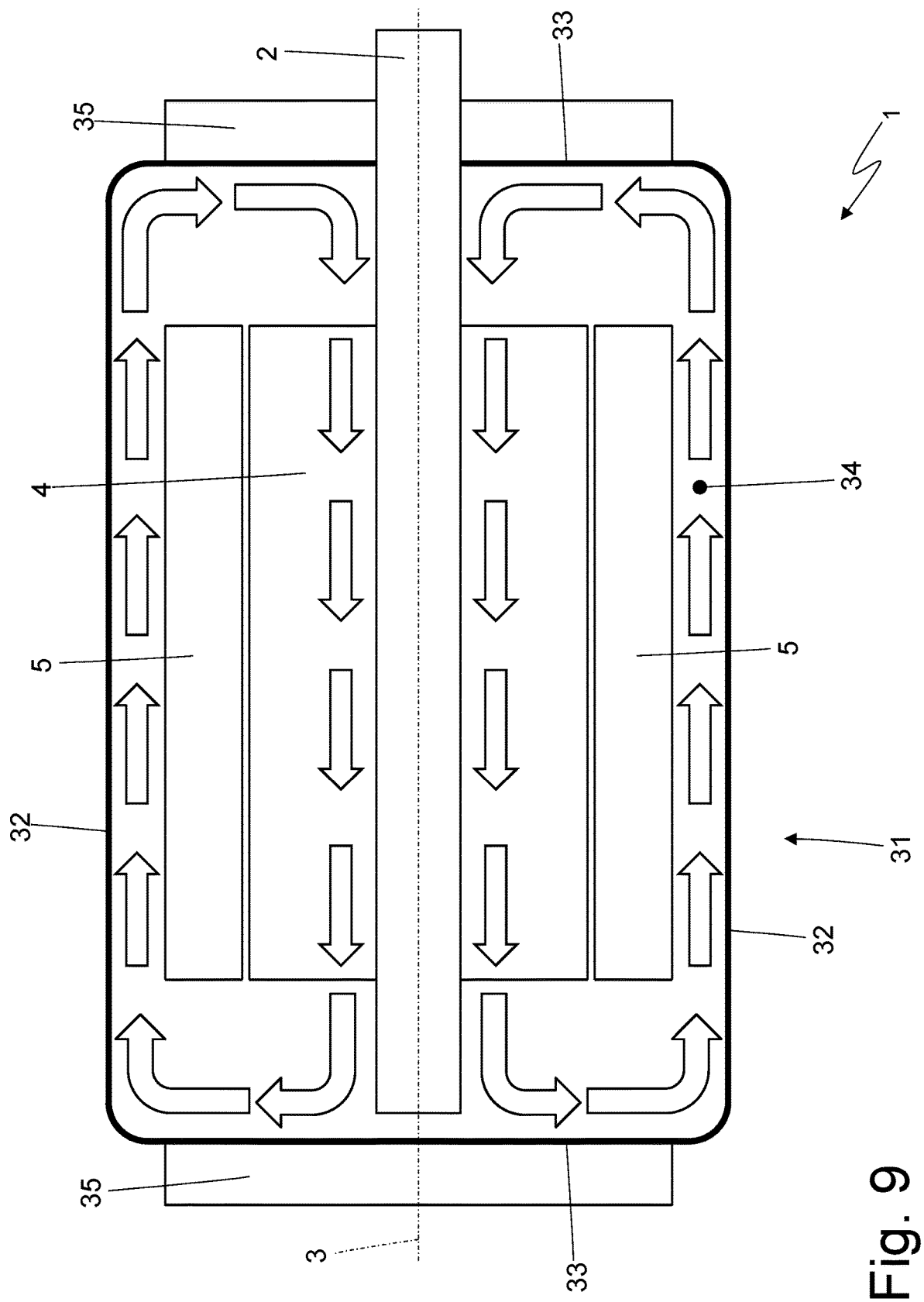
FIG. 9 is a schematic and longitudinal section view of the rotary electric machine of FIG. 1 with air flow paths during operation being highlighted.

According to what shown in FIG. 9, the spokes 30 of the shaft 2 are shaped (for instance as a helix) so as to cause the air present inside the shaft 2 to have an axially oriented component of motion; thereby, when the shaft 2 rotates, the air inside the shaft 2 (i.e. in the empty gaps between the spokes 30) receives an axial thrust generating an air flow directed axially crossing the shaft 2; the air flow which exits the shaft 2 hitting a cap 33 (arranged on the left in FIG. 9) is deviated outwardly up until it enters the annular hollow space 34 flowing through it along a direction opposite to the direction of motion provided by the spokes 30 of the shaft 2. Thereby, when the shaft 2 rotates, inside the casing 31 a continuous air flow is generated that circulates in a direction inside the shaft 2 and in an opposite direction outside the stator 5; this air flow takes heat away from the inside the shaft 2 and brings it to the casing 31 (i.e. towards the outside), in other words both towards the caps 33 (which can be coupled to heat exchangers 35 more or less integrated with the caps 33), and towards the central body 32 (which can be also coupled to a heat exchanger more or less integrated with the central body 32).

Figure 10:
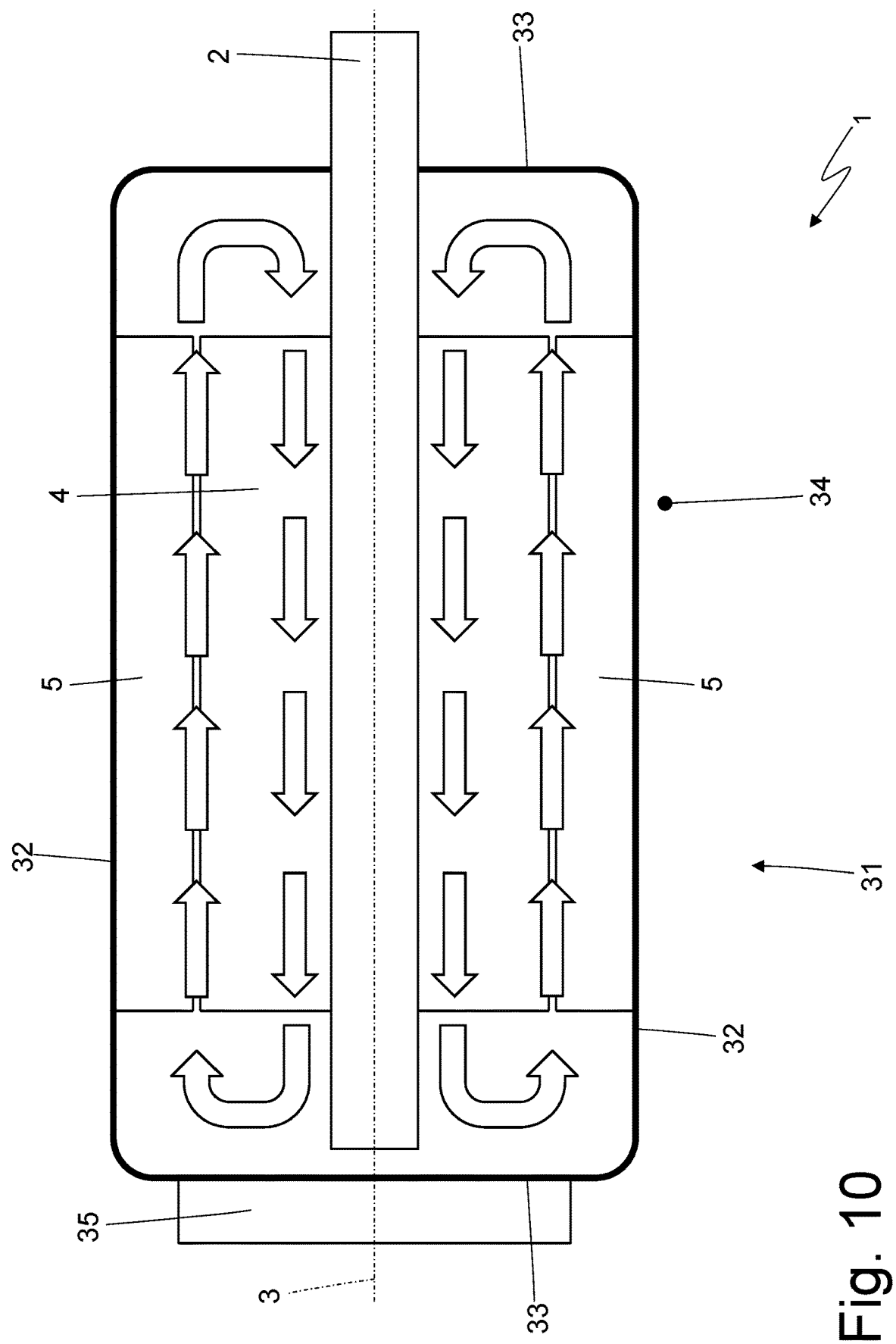
FIG. 10 is a schematic and longitudinal section view of a variant of the rotary electric machine of FIG. 1 with air flow paths during operation being highlighted.

In the variant shown in FIG. 10, the annular hollow space 34 is not provided and therefore the air flow exiting the shaft 2 hitting a cap 33 (arranged on the left in FIG. 10) is deviated towards the gap existing between the rotor 4 and the stator 5 up until it enters into the gap flowing through it with a direction opposite to the motion provided by the spokes 30 of the shaft 2.

Thereby, when the shaft 2 rotates, inside the casing 31 a continuous air flow is generated which circulates in a direction inside the shaft 2 and in an opposite direction inside the gap; this air flow takes heat away from inside the shaft 2 and from outside the rotor 4 and brings it towards the caps 33 of the casing 31 (i.e. outwardly). Obviously also in the embodiment shown in FIG. 9, a small part of the air flow flows through the gap instead of the hollow space 34; however, most of the air flow flows through the hollow space 34 which has a transversal section that is much larger than a transversal section of the gap.

Thanks to the continuous air flow being present inside the shaft 2 it is possible to effectively cool the shaft 2 and therefore all the rotor 4 without having to cool the rotor 4 by means of a coolant which is particularly complicated (requiring to continuously make the coolant pass from a fixed part to a rotary part).

According to one possible embodiment, inside the two caps 33, a plurality of fins are arranged that are shaped so as to guide an air flow from the centre to the periphery and vice versa, i.e. on the one hand for guiding the air flow from the shaft 2 towards the annular hollow space 34 and on the other hand for guiding the air flow from the annular hollow space 34 towards the shaft 2.

According to one preferred, though non-limiting, embodiment, the spokes 30 are also shaped so as to generate, during the rotation of the shaft 2, a predetermined sound; i.e. the shape of the spokes 30 is designed to generate, during the rotation of the shaft 2 a desired sound.

The herein described embodiments may be combined between them without departing from the protection scope of the present invention.

The above described electric machine 1 has several advantages.

Firstly, the above described electric machine 1 has a high power efficiency (i.e. a high yield between the inlet mechanical or electric power and the outlet mechanical or electric power).

Furthermore, the above described electric machine 1 has a high specific performance (power and/or torque), i.e. a high performance (power and/or torque) by mass and/or volume unit.

Finally, the above described electric machine 1 is of easy and cheap construction, as it does not substantially involve production costs higher than a traditional electric machine with equal performances.

LIST OF REFERENCE NUMBERS OF THE FIGURES 1 electric machine
2 shaft
3 rotation axis
4 rotor
5 stator
6 magnetic core
7 stator slot
8 stator winding
9 bars
10 legs
11 cusp
12 longer side
13 shorter side
14 insulating coating
15 longer side
16 shorter side
17 filling element
18 outer surface
19 inner surface
20 inner layer
21 outer layer
22 columns of permanent magnets
23 permanent magnets
24 containment element
25 glue
26 glue
27 seats
28 hub
29 rim
30 spokes
31 casing
32 central body
33 caps
34 annular hollow space
35 heat exchanger

The invention claimed is:

1. An electric machine (1) comprising:
   a shaft (2), which is mounted so as to rotate around a central rotation axis (3);
   a rotor (4) with permanent magnets (23), which is fitted to the shaft (2) so as to rotate together with the shaft (2);
   a stator (5) with a tubular, cylindrical shape, which is arranged around the rotor (4) so as to enclose, on the inside, the rotor (4) and has a magnetic core (6), which consists of a series of laminations made of a ferromagnetic material and is longitudinally crossed by a plurality of stator slots (7); and
   a stator winding (8) comprising a plurality of copper rigid bars (9), which are inserted in corresponding stator slots (7) and are covered, on the outside, with an insulating coating (14);
   wherein each stator slot (7) is completely free from an insulating element interposed between the ferromagnetic material making up the laminations of the magnetic core (6) and the corresponding bars (9), so that an outer surface (18) of the corresponding bars (9) is in direct contact with an inner surface (19) of the stator slot (7) made of the ferromagnetic material of the stator slot (7);
   wherein the insulating coating (14) which covers on the outside each bar (9) has an inner layer (20) that is in direct contact with the copper and an outer layer (21) that is arranged above the inner layer (20) and is in direct contact with the ferromagnetic material making up the laminations of the magnetic core (6); and
   wherein the inner layer (20) consists of a first material and the outer layer (21) consists of a second material that differs from the first material, has a higher wear resistance than the first material and is electrically less insulating than the first material.

2. The electric machine (1) according to claim 1, wherein the insulating coating (14) covering each bar (9) on the outside has a thickness of more than 0.30 mm.

3. The electric machine (1) according to claim 1, wherein the first material is an enamel.

4. The electric machine (1) according to claim 1, wherein the first material is a resin.

5. The electric machine (1) according to claim 1, wherein the inner layer (20) essentially has the function of ensuring electric insulation while the outer layer (21) essentially has the function of mechanically protecting the inner layer (20) from rubbing against the inner surface (19) of the stator slot (7).

* * * * *